Dec. 9, 1952   B. ABRUSCATO   2,620,754
DOUGH KNEADER
Filed Dec. 9, 1949   2 SHEETS—SHEET 1
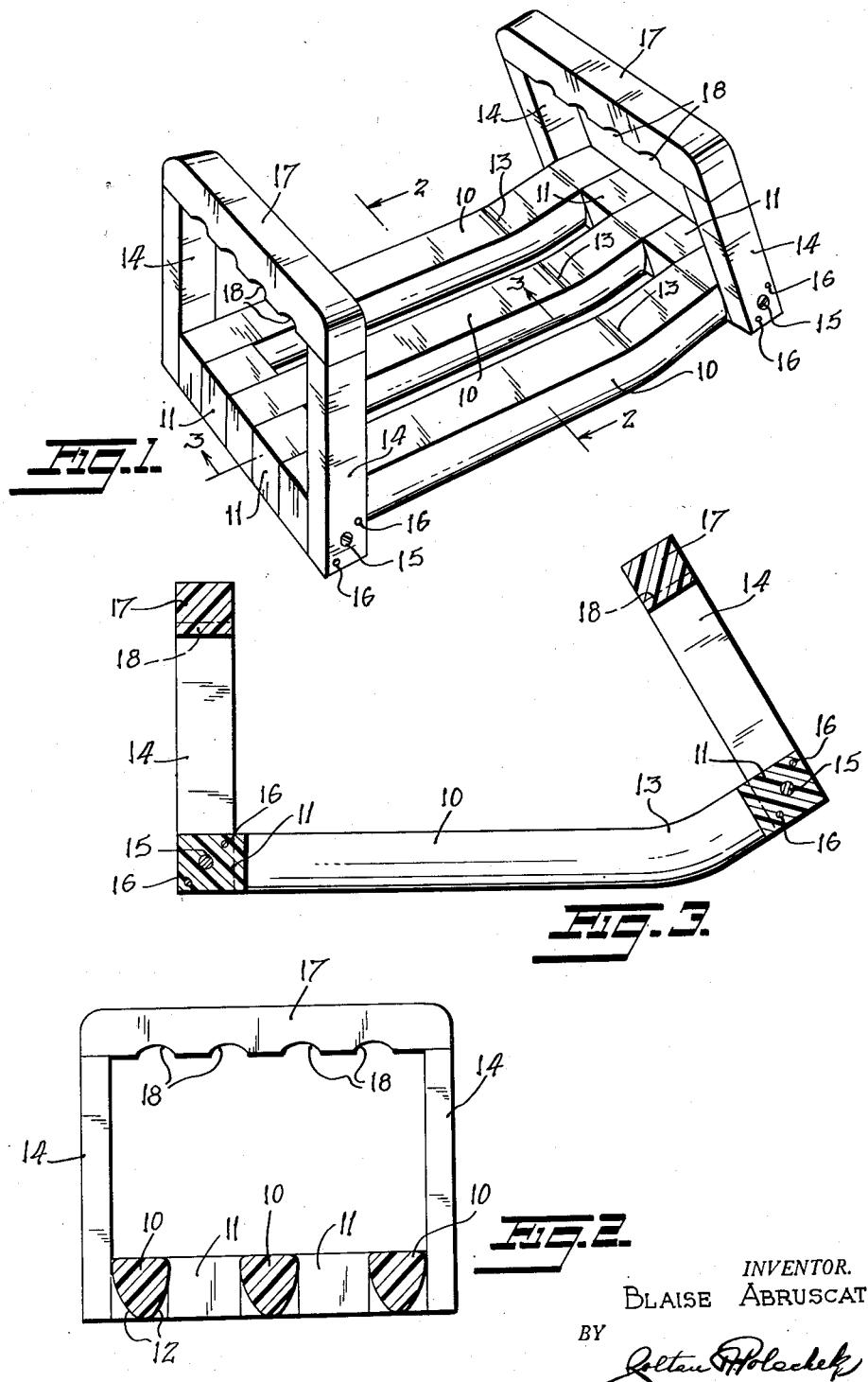
INVENTOR.
BLAISE ABRUSCATO
BY
ATTORNEY Dec. 9, 1952   B. ABRUSCATO   2,620,754
DOUGH KNEADER
Filed Dec. 9, 1949   2 SHEETS—SHEET 2
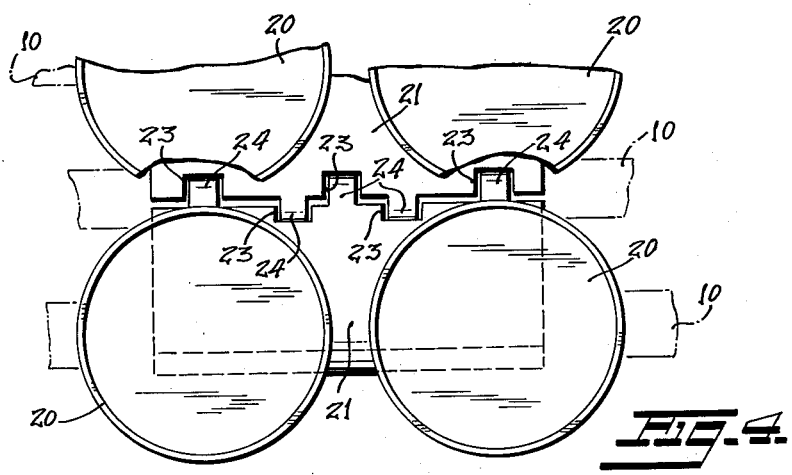
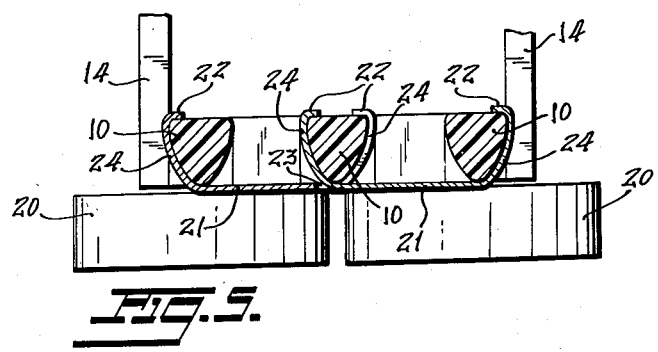
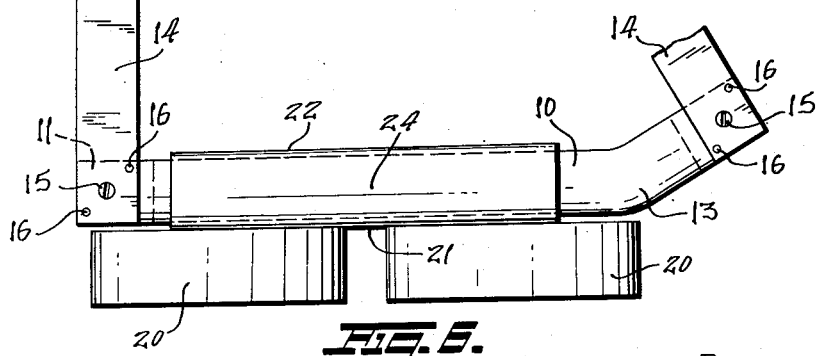
INVENTOR.
BLAISE ABRUSCATO
BY
*Jotten H. Holacek*
ATTORNEY Patented Dec. 9, 1952

2,620,754

UNITED STATES PATENT OFFICE 2,620,754

DOUGH KNEADER

Blaise Abruscato, Ozone Park, N. Y.

Application December 9, 1949, Serial No. 131,958

1 Claim. (Cl. 107—47)

This invention relates to a device for kneading and cutting dough into forms.

The principal object of the invention is the provision of a simple, rocking dough kneader.

Another object of the invention is to construct said kneader so as to provide for the rocking operation thereof by both hands.

A further object of the invention is to construct said kneader so as to admit the facile and economical manufacture thereof.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a perspective view of the kneader of the invention with the cutting attachment removed.

Fig. 2 is a sectional view of the kneading device on line 2—2 of Fig. 1.

Fig. 3 is a sectional view of the kneading device on line 3—3 of Fig. 1.

Fig. 4 is a view of the under side of one complete cutting attachment and fragments of another, and serves to illustrate certain cooperating features of the two.

Fig. 5 is a sectional view of the kneader on about the same line as Fig. 2 but with the cutting attachment shown secured in place, and with certain parts broken away and, Fig. 6 is a view in side elevation of the kneader with the cutter attached thereto.

Referring to Fig. 1, the kneader comprises a plurality of kneading bars 10 spaced apart by blocks 11 between their ends. The bars 10, and blocks 11, can, of course, be integral if such is desired, and are preferably made of wood or plastic. Each of the bars 10 has its lower edge rounded as at 12 (Fig. 2) and each is curved upward at one end, preferably at an angle of approximately 45° as at 13 (Fig. 3). Each of the outer bars 10 is provided at either end with an upright post 14, the posts 14 at said curved ends being upright with respect to said curve as horizontal. Preferably the posts are made of stainless steel, and they are secured to the bars 10 and blocks 11 by a screw 15 (Figs. 1 and 3) passed through the ends of said bars, the blocks and the posts, and by dowel pins 16.

Atop the posts 14 at each end of bars 10 is secured a handle rail 17 having its upper edge rounded to fit the palm of the hand and having finger grooves 18 in its under edge.

The construction is such that, to knead dough, the handles 17 are grasped in the hands, the bars 10 laid on the dough, and the device rocked firmly about curve 13, the nonparallel arrangement of the handle posts 14 aiding such movements.

In order to provide for cutting and forming the kneaded dough, there are provided a pair of cooperating cutting and forming attachments which can quickly and simply be secured to or removed from the bars 10.

These attachments each include a plurality of open bottom, thin walled sheet metal cutting and forming cups 20, which although depicted as circular in Fig. 4 may be of any shape, said cups being secured in any suitable way to a sheet metal plate 21 having one longitudinal edge bent up and back on itself to form a lip 22 (Fig. 5) to engage the flat upper edge of either of the outer bars 10 and having a plurality of notches 23 in the other longitudinal edge interspersed with a plurality of bent over lips 24 (Fig. 4), said lips 24 each engaging the upper edge of the center bar 10. It will be noted that in Fig. 4, one of the plates 21 is provided with three lips 24 which pass through the notches 23 in the other plate in position to engage said center bar, and that said other plate is provided with two lips 24 which cooperate with notches 23 in the first-mentioned plate in similar manner.

To affix either of the cutting attachments, the lip 22 is engaged with the outer bar 10 and the plate 21 pressed against the bars 10 until the lips 24 engage the upper edge of the center bar.

The dough is cut in the desired form by grasping the handles 17 and pressing the edges of cups 20 thereinto.

While I have illustrated and described the preferred embodiment of my invention, it is to be understood that I do not limit myself to the precise construction herein disclosed and the right is reserved to all changes and modifications coming within the scope of the invention as defined in the appended claim.

Having thus described my invention, what I claim as new, and desire to secure by United States Letters Patent is:

A device for kneading dough comprising a plurality of fixed bars spaced apart by blocks situated between the adjacent faces of their ends and having their lower edges rounded, said bars also having adjacent ends curved upward at a substantial angle, a pair of posts secured to said plurality of bars at either end of the latter, said posts being upright with respect to the portion of the bars with which they are associated, and a handle secured atop each pair of posts.

BLAISE ABRUSCATO.

REFERENCES CITED

The following references are of record in the file of this patent:

UNITED STATES PATENTS

| Number | Name | Date |
|---|---|---|
| 128,462 | Chadwick | July 2, 1872 |
| 437,099 | Davis | Sept. 23, 1890 |
| 1,188,225 | Wegner | June 20, 1916 |
| 1,399,449 | Trethewey | Dec. 6, 1921 |
| 1,417,985 | Geiger | May 30, 1922 |
| 1,477,693 | Clark | Dec. 18, 1923 |
| 2,091,754 | Fedje | Aug. 31, 1937 |
| 2,490,616 | Brabazon | Dec. 6, 1949 |